United States Patent [19]

Mintz et al.

[11] Patent Number: 4,701,263

[45] Date of Patent: Oct. 20, 1987

[54] USE OF AMINE NEUTRALIZED SULFONATED POLYSTYRENES FOR PARTICLE FLOCCULATION

[75] Inventors: Donald J. Mintz, Summit; Dennis G. Peiffer, East Brunswick; Warren A. Thaler, Flemington; Ilan Duvdevani, Leonia, all of N.J.

[73] Assignee: Exxon Research and Engineering Company, Florham Park, N.J.

[21] Appl. No.: 812,518

[22] Filed: Dec. 23, 1985

[51] Int. Cl.$^4$ .............................................. B01D 21/00
[52] U.S. Cl. .................................. 210/728; 23/313 R; 208/424; 208/426; 209/5; 210/732; 210/735; 210/737
[58] Field of Search ............ 23/313 R; 208/179, 180, 208/424, 426; 209/5; 210/725, 727, 728, 732, 735, 737; 502/22, 24

[56] References Cited

U.S. PATENT DOCUMENTS

| | | | |
|---|---|---|---|
| 3,009,873 | 11/1961 | Kerr | 210/732 |
| 3,526,586 | 9/1970 | Camp | 210/634 |
| 3,563,885 | 2/1971 | Talbot | 208/180 |
| 3,642,728 | 2/1972 | Canter | 525/341 |
| 3,836,511 | 9/1974 | O'Farrell | 524/344 |
| 3,870,841 | 3/1975 | Makowski et al. | 524/132 |
| 4,138,224 | 2/1979 | Gorin | 208/426 |
| 4,256,571 | 3/1981 | Somasundaran et al. | 209/5 |
| 4,304,702 | 12/1981 | Makowski et al. | 525/344 |
| 4,507,486 | 11/1977 | Meadus et al. | 208/426 |
| 4,511,479 | 4/1985 | Fuller et al. | 210/708 |

FOREIGN PATENT DOCUMENTS 52-6727  2/1977  Japan .................................. 208/181

*Primary Examiner*—Peter Hruskoci
*Attorney, Agent, or Firm*—Richard E. Nanfeldt

[57] ABSTRACT

A process for flocculating solid fines from a solution comprising said solid fine and an organic liquid which comprises the steps of:

(a) adding with mixing about 5 to about 10,000 ppm of an unneutralized or neutralized sulfonated polystyrene to said solution; and (b) heating at about 25° C. to about 350° C. for about 1 to abou 45 minutes the mixture of said solution and said neutralized or unneutralized polystyrene.

2 Claims, No Drawings

USE OF AMINE NEUTRALIZED SULFONATED POLYSTYRENES FOR PARTICLE FLOCCULATION

BACKGROUND OF THE INVENTION

In many industrial processes it is desirable to separate a finely dispersed phase from the liquid in which it is dispersed. The ease of this separation can be enhanced if the fine particles flocculate to form large aggregates. This flocculation can be made to occur by employing a polymeric additive that initially dissolves or disperses in the liquid, but then precipitates from solution while interacting with the particulates. Precipitation of the polymer can be induced by chemical or physical factors in the environment in which the polymer is dissolved or dispersed. Flocculation of particles results when the polymer coated particles collide. Thus, the physical or chemical factors in the environment need not be changed for the polymer to precipitate.

The present invention teaches that coke fines and catalyst fines can be flocculated out of solution by the addition of an unneutralized or neutralized sulfonated polystyrene to the solution of the coke fines or catalyst fines. The sulfonated polystyrene interacts with the catalyst fines or coke fines and a precipitate is formed of the sulfonated polystyrene and catalyst fines or coke fines.

Flocculation of other fines, such as synthetic fuels, shale and coal fines, can be promoted by the use of the sulfonated polystyrene as a flocculating agent.

SUMMARY OF THE INVENTION

The present invention relates to a process for promoting the precipitation of solid fines out of a liquid medium. The process comprises the step of adding to a liquid containing solid fines a sufficient amount of an unneutralized or neutralized sulfonated polystyrene to cause the precipitation out of the liquid of the solid fine. The unneutralized or neutralized sulfonated polymer interacts with the solid fines by adsorption of the sulfonated polymer onto the surface of the solid fines. The solid fines collide to form agglomerates which precipitate out of the solution.

GENERAL DESCRIPTION OF THE INVENTION

The present invention relates to a process for promoting the precipitation of solid fines out of a liquid medium. The process comprises the step of adding to a liquid containing solid fines a sufficient amount of an unneutralized or neutralized sulfonated polystyrene to cause the precipitation out of the liquid of the solid fine. The unneutralized or neutralized sulfonated polymer interacts with the solid fines by absorption of the sulfonated polymer onto the surface of the solid fines. The solid fines collide to form agglomerates which precipitate out of the solution.

The solid fines are selected from the group consisting of coke fines, catalyst fines, synthetic fuel fines, coal fines and shale fines. The water insoluble, oil soluble unneutralized or neutralized sulfonated polymers will comprise from about 0.5 to about 100 mole percent pendant sulfonate groups, more preferably about 4 to 30 mole percent pendant sulfonate groups. The sulfonated polymers utilized in the instant invention are either unneutralized or neutralized with the basic materials selected from Groups IA, IIA, IB and IIB of the Periodic Table of Elements and lead, tin, alumina and antimony, as well as ammonium and amine counterions. Sulfonated polymers which are subject to the process of the instant invention are illimitable and are plastic polymers. Specific polymers include sulfonated polystyrene, sulfonated t-butyl styrene, sulfonated ethylene copolymers and sulfonated propylene copolymers. The preferred polymers of the instant invention are polystyrenes.

Neutralization of the cited sulfonated polymers with appropriate metal hydroxides, metal acetates, metal oxides, amines or ammonium hydroxide, etc. can be conducted by means well-known in the art. For example, the sulfonation process of polystyrene can be conducted in a suitable solvent, such as toluene, with acetyl sulfate as the sulfonated agent, such as described in U.S. Pat. No. 3,836,511. The resulting sulfonic acid derivative can be employed as the flocculating agent or the sulfonic acid derivative can then be neutralized with a number of different neutralization agents, such as n-amine, sodium phenolate and similar metal salts. The amounts of such neutralization agents employed will normally be equal stoichiometrically to the amount of free acid in the polymer, plus any unreacted reagent which is still present. It is preferred that the amount of neutralizing agent be equal to the molar amount of sulfonating agent originally employed, plus 10% more to ensure full neutralization. The use of more of such neutralization agent is not critical. Sufficient neutralization agent is necessary to effect at least 50% neutralization of the sulfonic acid groups present in the polymer, preferably at least 90%, and more preferably essentially complete neutralization of such acid groups should be effected.

The degree of neutralization of said sulfonate groups may vary from 0 (free acid form) to 100 mole percent.

The amines employed as neutralizing agents in the instant invention are selected from the group consisting of primary, secondary and tertiary amines, wherein the amines have about 1 to about 30 carbon atoms.

The sulfonated polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

The preferred sulfonate for use in the instant invention, e.g., sulfonated polystyrene and substituted derivatives thereof, may be prepared by the procedures described in U.S. Pat. No. 3,870,841, filed Oct. 2, 1972 in the names of H. S. Makowski, R. D. Lundberg and G. H. Singhal, hereby incorporated by reference.

The water insoluble, sulfonated polymers are dissolved in an organic liquid at a level of from 0.01 to 20.0 weight percent and more preferably from 0.1 to 3.0 weight percent. The solution of sulfonated polymer in the organic liquid is added to the solution of the solid fines wherein about 5 to about 10,000 ppm of the sulfonated polystyrene is being added to the solution of the solid fines, more preferably about 25 to about 2,000, and most preferably about 100 to about 500.

The sulfonated polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure.

The neutralized polymer may then be isolated be means well-known to those skilled in the art, i.e., coagulation, steam stripping or solvent evaporation, because the neutralized polymer has sufficient thermal stability to be dried for employment at a later time in the process of the instant invention.

It is also possible to neutralize the acid form of these polymers in situ, however, this is not a preferred operation since in situ neutralization requires preparation of the sulfonic acid in the organic liquid which is to be subjected to the instant process, or the acid form of the sulfonated polymer must be dissolved in said organic liquid.

Suitable polystyrene polymers useful in forming the sulfonated polystyrene polymers have an $\overline{M}_n$ as measured by GPC of about 10,000 to about 500,000, more preferably about 20,000 to about 200,000, and most preferably about 50,000 to about 200,000.

Suitable organic liquids for forming the solution of the unneutralized or neutralized sulfonated polymer are aromatic hydrocarbons, such as benzene, toluene, cat cracker bottoms and steam cracker tar, as well as mixtures of these with alcohols.

The process of the instant invention for the flocculation of the solid fines from a solution of the solid fines comprises the steps of adding with mixing about 25 to about 2,000 ppm of an unneutralized or neutralized sulfonated polystyrene to the solution of the solid fines and heating the mixture (if necessary) of the sulfonated polystyrene and the solution of the organic liquid and the solid fines at a sufficient temperature to reduce the viscosity to less than 100 cP for a sufficient period of time (usually about 5 to 30 minutes) to cause the precipitation of the solid fines from the solution. The organic liquid remaining after precipitation occurs is significantly reduced in particulate content.

DESCRIPTION OF THE PREFERRED EMBODIMENTS

The following Examples illustrate the present invention without, however, limiting the same hereto.

EXAMPLE 1

Preparation of Amine Salts of a Water Soluble Sulfonated Polystyrene

An aqueous solution (184.2 g) of a fully sulfonated polystyrene containing 55.3 g polymer was stirred with 0.3 mole of an organic amine, wherein the sulfonated polystyrene was prepared according to the procedure of U.S. Pat. No. 3,642,728, herein incorporated by reference. Water insoluble amine salts were steam stripped and vacuum dried. Water soluble amine salts were isolated by evaporation of the water and vacuum dried.

Preparation of Salts of Organic Soluble Sulfonated Polystyrene 0.1 mole of amine was dissolved in toluene or methyl chloride containing 20-25% of methanol. 55 g of 21% sulfonated polystyrene was added and stirring continued until polymer solution was complete. Solutions were steam stripped, washed with water in a high speed blender and dried, either in vacuum at 50° C. or in a fluidized bed drier at 100° C.

EXAMPLE 2

This Example illustrates the use of amine neutralized sulfonated polystyrene for the flocculation of catalyst fines an aliphatic oil.

A catalyst consisting of ruthenium doped titanium oxide can be used to produce a paraffinic wax product from remote gas deposits. However, if this catalyst is used in a slurry mode the paraffinic product has finely dispersed catalyst fines that seem to form a stable dispersion in it. These catalyst fines can be flocculated to form large aggregates that fall out of suspension if fully sulfonated polystyrene neutralized with tristearyl amine is introduced at the 300 ppm level as a 1% solution in toluene. The mixture is then heated to 190° C. on a hot plate under a nitrogen blanket for 45 minutes. The resultant melted wax appeared crystal clear after this treatment. A control treated in the same manner appeared cloudy.

EXAMPLE 2

This Example illustrates the use of amine neutralized sulfonated polystyrene for the flocculation of catalyst fines in an alkyl-naphthenic oil.

A catalyst consisting of submicron particles of silica alumina was dispersed in the white oil Primol 355, which is dominantly alkyl-naphthenic in character. Sulfonated (100%) polystyrene neutralized with tristearyl amine was introduced as a 1% solution in toluene. The amount of polymer introduced was 300 ppm on oil. The polymer and the particle-containing white oil were then mixed and put on a hot plate at 170° C. for 20 minutes under a nitrogen blanket. The white oil appeared crystal clear after this treatment. A control treated in the same manner appeared cloudy.

EXAMPLE 3

This Example illustrates the use of amine neutralized sulfonated polystyrene for the flocculation of coke fines in an aromatic oil.

One percent by weight of coke fines 1-20 microns in diameter were mixed into the aromatic oil 1-methyl naphthalene. Three hundred ppm on oil of the polymer: sulfonated (100%) polystyrene neutralized with dimethyl n-dodecyl amine was introduced as a 1% solution in 95% toluene+5% methanol. The mixture was then mixed and placed on a hot plate at 150° C. for 15 minutes under a nitrogen blanket. The aromatic oil treated in this manner appeared crystal clear after 15 minutes. A control treated in the same manner appeared cloudy.

What is claimed is:

1. A process for flocculating solid fines selected from the group consisting of coke fines, catalyst fines, synthetic fuel fines, coal fines, and shale fines from a solution comprising said solid fines and an organic liquid which comprises the steps of:
   (a) adding with mixing about 5 to about 10,000 ppm of a water insoluble unneutralized or neutralized sulfonated polystyrene to said solution wherein said sulfonated polystyrene is dissolved in a dissolving organic liquid at a concentration level of about 0.01 to about 20 weight percent, and has about 0.5 to about 100 mole percent of sulfonate groups; and
   (b) heating at about 25° C. to about 350° C. for about 1 to about 45 minutes the mixture of said solution and said unneutralized or neutralized polystyrene wherein said sulfonated polystyrene is absorbed on the surface of said solid fines, and said solid fines collide to form agglomerates which precipitate out of said solution.

2. A process according to claim 1 wherein said sulfonate groups are neutralized with a metal counterion or an amine.

* * * * *